United States Patent

Yatake

[11] Patent Number: 5,197,060
[45] Date of Patent: Mar. 23, 1993

[54] DUAL SUBSTRATE OPTICAL RECORDING MEDIUM

[75] Inventor: Masahiro Yatake, Suwa, Japan

[73] Assignee: Seiko Epson Corporation, Tokyo, Japan

[21] Appl. No.: 576,490

[22] PCT Filed: Jan. 11, 1990

[86] PCT No.: PCT/JP90/00025
§ 371 Date: Sep. 11, 1990
§ 102(e) Date: Sep. 11, 1990

[87] PCT Pub. No.: WO90/08382
PCT Pub. Date: Jul. 26, 1990

[30] Foreign Application Priority Data

| Jan. 11, 1989 | [JP] | Japan | 1-4040 |
| Jan. 24, 1989 | [JP] | Japan | 1-14413 |
| Jan. 30, 1989 | [JP] | Japan | 1-20134 |
| Feb. 13, 1989 | [JP] | Japan | 1-33126 |
| Dec. 11, 1989 | [JP] | Japan | 1-321003 |

[51] Int. Cl.⁵ .......................... G11B 7/24; G11B 11/10
[52] U.S. Cl. ........................ 369/283; 369/286; 369/275.5; 428/694; 430/495; 430/945; 346/135.1
[58] Field of Search ........... 369/280, 282, 283, 284, 369/286, 275.1, 275.3, 275.5; 346/135.1; 430/945, 495; 428/694

[56] References Cited

U.S. PATENT DOCUMENTS

| 4,885,992 | 8/1989 | Ikegawa et al. | 346/135.1 |
| 4,939,013 | 7/1990 | Kimura et al. | 346/135.1 |
| 4,954,379 | 9/1990 | Nishida et al. | 346/135.1 |
| 4,956,213 | 9/1990 | Nasuda | 346/135.1 |
| 4,956,214 | 9/1990 | Imataki et al. | 346/135.1 |
| 4,956,216 | 9/1990 | Hausler et al. | 346/135.1 |
| 4,975,355 | 12/1990 | Suzuki | 346/135.1 |
| 4,985,289 | 1/1991 | Kamazaki et al. | 341/135.1 |

FOREIGN PATENT DOCUMENTS

| 172547 | 10/1982 | Japan . |
| 111141 | 7/1983 | Japan . |
| 217945 | 9/1986 | Japan . |
| 13785 | 1/1988 | Japan . |
| 58639 | 3/1988 | Japan . |
| 171444 | 7/1988 | Japan . |

Primary Examiner—Stuart S. Levy
Assistant Examiner—Joseph A. Rhoa
Attorney, Agent, or Firm—Blum Kaplan

[57] ABSTRACT

The present invention relates to a structure of optical disks fabricated by pasting two substrates together using an adhesive composed of thermo-setting resin and UV-curing resin and to a process for fabricating the said optical disks. Ceramic layers are formed in the inner and outer circumference parts but neither recording layer nor reflective layer is formed in the said parts so that UV-light can penetrate into the adhesive. Therefore, the two substrates can be temporarily fixed by irradiating them with UV-light because the UV-curing components of the adhesive in the inner and outer circumference parts hardens thereby. The optical disk temporarily fixed is heated to harden the thermo-setting components of the adhesive, thereby the substrates being perfectly pasted together. The temporal fixing of the substrates using UV-curing resin has such effects as that the substrates can be set upright, and therefore no strain occurs in the substrates, and that the adhesive does not overflow. The forming of the ceramic layers in the inner and outer circumference parts has such an effect as that the adhesion strength of the substrates in the said parts is increased, thereby increasing the long-time reliability of the optical disk.

4 Claims, 2 Drawing Sheets

DUAL SUBSTRATE OPTICAL RECORDING MEDIUM

FIELD OF THE INVENTION

The present invention relates to an optical disk and a process for fabricating them.

BACKGROUND ART

As shown in Japanese Patent Application laid open to public No. 63-94140, the conventional optical disks have a structure in which the side face of the recording layer is not covered with such a film as a ceramic protection film, a metallic reflective film, or the like. As shown in U.S. Pat. No. 4,731,620, the adhesion layer using UV-curing resin can be formed only in the region in which no recording layer is formed. Furthermore, the adhesion layer using thermo-setting resin is directly connected to the substrate in the outer circumference region of the substrate, as shown in U.S. Pat. No. 4,731,620.

On the other hand, the conventional processes for fabricating optical disks use only either UV-curing or thermo-setting resin.

However, the structure of the above optical disks has problems in that
 (1) the adhesion strength is low in the inner and outer circumference parts of the substrate, and that
 (2) the side face of the recording layer tends to degrade.

Furthermore, the processes for fabricating the above optical disks have problems in that
 (1) strain tends to occur in the substrates because they are laid in the thermo-setting step, and that
 (2) the adhesive tends to overflow the side face of the substrate in the hardening step and the like of the adhesive.

Accordingly, the present invention has been achieved in order to solve the above described problems. An object of the present invention is to increase the weather resistance of the recording layer, a second object is to make it possible to set the substrates upright in the thermo-setting step, and a third object is to prevent the adhesive from overflowing in the thermo-setting process and the like.

DISCLOSURE OF THE INVENTION

In order to solve the above described problems, the optical disk of the present invention is:

(1) an optical disk having a first substrate, a second substrate and an adhesive layer pasting the above first and second substrates together, characterized in that the optical disk has, on each of the substrates, a first protecting layer formed thereon, a recording layer formed on the said first protecting layer, a second protecting layer formed on the said recording layer, a reflective layer formed on the said second protecting layer within the region outer than the central hole bored on the above substrates and inner than the outer diameter of the above substrates, and a ceramic layer formed on the said reflective layer within the region surrounded by a diameter smaller than the inner diameters of the above reflective layer and the above recording layer and a diameter larger than the outer diameters of the above reflective layer and the above recording layer;

(2) an optical disk having first substrate, a second substrate and an adhesion layer pasting the above first and second substrates, characterized in that the above adhesive layer is composed of thermo-setting resin and UV-setting resin;

(3) characterized in that each of the substrates has a first protecting layer formed thereon, a recording layer formed on the said first protecting layer, a second protecting layer formed on the said recording layer, and a reflective layer formed on the said second protecting layer within the region outer than the above central hole and inner than the outer diameter of the above substrates;

(4) characterized in that the recording layer comprises a rare earth-transition metal alloy;

(5) characterized in that the recording layer is formed either on the above first substrate or on the above second substrate. Furthermore, the process for fabricating the optical disks according to the present invention is:

(6) a process for fabricating optical disks comprising a first substrate, a second substrate and an adhesive layer pasting the above first and second substrates together, which has steps to form thin films on each of the above substrates and a step to paste the above first and second substrates, characterized in that the process has the steps of coating the above first substrate or the above second substrate with an adhesive composed of thermo-setting resin and UV-setting resin, pasting the above first substrate and the above second substrate together, irradiating the above pasted substrates with UV-light, and heating the above pasted substrates after the said UV-irradiation step;

(7) characterized in that steps to form the thin films include the steps of forming, on each of the substrates, a protecting layer thereon, forming a recording layer on the above first protecting layer, forming a second protecting layer on the said recording film, forming a reflective layer on the above second protecting layer within the region outer than the central hole bored on each of the above substrates and inner than the outer diameter of the above substrates, and forming a ceramic layer on the above reflective layer within the region surrounded by a diameter smaller than the inner diameters of the above reflective layer and the above recording layer and another diameter larger than the outer diameters of the above reflective layer and the above recording layer;

(8) characterized in that the recording layer comprises a rare earth-transition metal alloy; and (9) characterized in that the recording layer is formed either on the above first substrate or the above second substrate.

BEST MODES OF THE EMBODIMENT OF THE PRESENT INVENTION

Example 1

The present invention will be explained in detail with reference to the figures.

Figure 1:
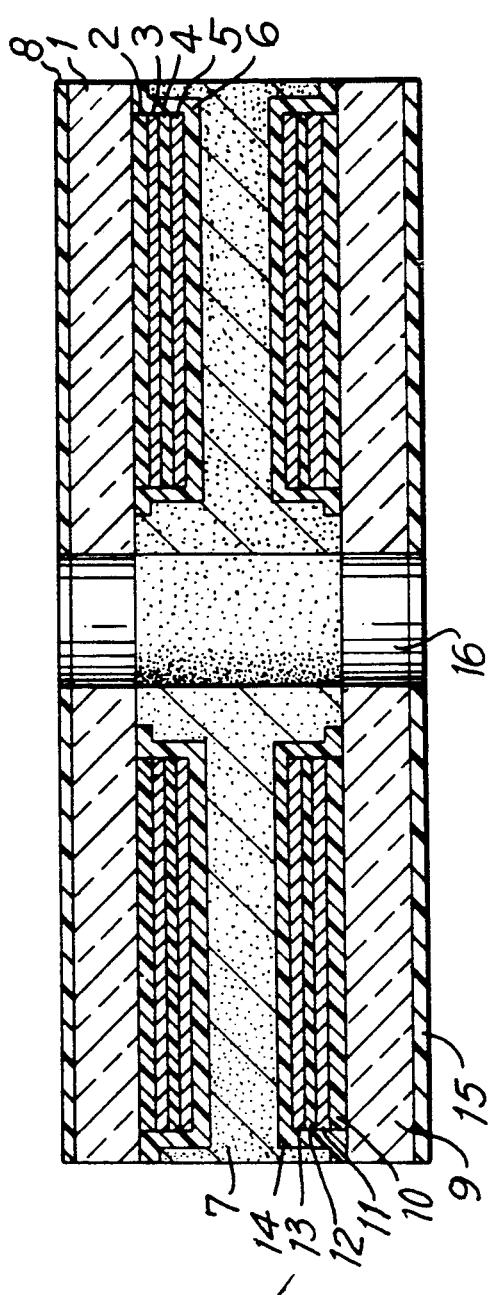
FIG. 1 shows a main cross sectional view of an example of the optical disk according to the present invention.

FIG. 1 shows a schematic view of the optical disk according the present invention. Numerals 1 and 9 each show a substrate made of polycarbonate, numerals 2 and 10 each show a first protecting layer made of SiAlN, numerals 3 and 11 each show a recording layer made of NdDyFeCo, numerals 4 and 12 each show a second protecting layer made of SiAlN, numerals 5 and 13 each show an Al layer, numerals 6 and 14 each show a SiAlNO layer, numeral 7 shows an adhesive layer, numerals 8 and 15 each show a hard coat layer and numeral 16 shows a central hole.

The substrates made of polycarbonate, indicated with numerals 1 and 9, were formed by injection-compression molding. The layers of SiAlNO, NdDyFeCo, SiAlN and Al were formed continuously in this order, with a mask holder attached to the substrate 1 or 9 made of polycarbonate so that neither recording layer nor reflective layer is formed in the inner or outer circumference part of the substrate. The first protecting layers 2 and 10 made of SiAlN were formed by RF reaction magnetron sputtering method using a sintered target made of SiAl and a mixed gas composed of nitrogen and argon. The recording layers 3 and 11 made of NdDyFeCo were formed by DC magnetron sputtering method using an alloy target made of NdDyFeCo. The second protecting layers 4 and 12 made of SiAlN were formed by RF reaction magnetron sputtering method using a mixed gas composed of nitrogen and argon, as in the formation of the first protecting layers 2 and 10 made of SiAlN. The Al layers 5 and 13 were formed by DC magnetron sputtering method using an Al target and an argon gas. The SiAlNO layers 6 and 14 were formed by RF reaction magnetron sputtering method using an alloy target made of SiAl and a mixed gas composed of nitrogen, oxygen and argon. The SiAlNO layers 6 and 14 were formed after removing the mask holders which covered the inner and outer circumference parts of the disks. The removal of the mask holders was carried out when the vacuum system was opened to atmosphere after forming the Al layers 5 and 13. The adhesion layer 7 was formed by coating either of the substrates on the side on which the recording layer was formed with a mixture composed of Epiclon S-129 (Dai-Nippon Ink. Co.), Epicure IBM-12 (Yuka-Shell Epoxy Co.), 1,6-hexanediol diacrylate, t-butyl peroxy isobutylate and Irgacure 907 (Ciba-Geigy Co.) in a ring form. Thereafter, the above substrate was pasted with the other substrate together in vacuum. The paste substrates were heated on a hot plate to spread the adhesive. After spreading the adhesive homogeneously, the adhesive was irradiated with UV-light using a metal halide lamp to harden the UV-setting component of the adhesive in the parts on which no recording layer was formed. Thereafter, the substrates were heated at 50° C. for 3 hours, then at 60° C. for 8 hours to harden the adhesion layer. The hard coat layers 8 and 15 were formed by spin-coating the surfaces of the substrates with a mixture composed of trimethylolpropane triacrylate, 1,6-hexanediol diacrylate and Irgacure 907 (Ciba-Geigy Co.), and then irradiating it with UV-light using a high pressure mercury lamp to harden it.

The results obtained from environment test of the optical disk formed by applying the process for pasting according to the present invention is shown in Table 1 together with the results obtained from environment test using optical disks formed by applying conventional processes.

TABLE 1

|  | Process for Pasting | Environment test condition 70° C. 90% RH 3000 Hours |
|---|---|---|
| Present Invention | Epoxy-based | No Change |
| Comparative Example | Epoxy-based | Exfoliation along the Inner and Outer Circumference |
|  | Roll-Coat | Oxidation of the Recording Layer |

The optical disk formed by pasting substrates using epoxy-based adhesive in the comparative examples was formed by using the same structure and process as those of this example except that it did not have any ceramic layer on each of the reflective layers in the structure shown in FIG. 1. The optical disk formed by roll-coat in the comparative examples was formed by coating a substrate with a hot-melt type adhesive by roll-coat method, and then pasting the substrate with another substrate together.

As the results in Table 1 clearly show, the optical disk of the present invention and the optical disks fabricated by the process of the present invention are reliable for a long period of time. They do not change even when they are left at a high temperature under a high humidity for a long periods of time.

The present invention shows the similar effects also in the following examples as in this examples.

For example, the ceramic layer on each of the Al reflective layers is made of SiAlNO in Example 1. However, the SiAlNO can be formed using oxynitrides such as SiAlBNO, SiAlPNO, SiPO, and the like; nitrides such as SiN, AlN, BN, SiAlN, SiAlPN, SiAlBN, and the like; oxides such as AlO, SiO, MgO, BeO, and the like; fluorides; carbides; and silicates. Almost every ceramics can be used regardless of being transparent or not.

In Example 1, a first protecting layer, a recording layer, a second protecting layer, a reflective layer were formed in this order on each of the substrates, wherein the formation of the above recording layer in the inner and outer circumference parts of each of the substrates was prevented. However, the structure can be that in which the ceramic layer is formed after the recording layer is placed between the protecting layers, in other words, a structure in which a ceramic layer is formed on the structure without any reflective layer.

Furthermore, the first and second protecting layers can be larger than the recording layer and reflective layer. They may, for example, cover the whole part of the surface of each of the substrates.

Other than polycarbonate resins, acrylic resins, styrene resins, polyester resins, polyamide resins, and their co-polymerized resins can be used as a material for the substrate.

Example 2

The structure of the optical disk of this example is shown in FIG. 1. An epoxy adhesive was used for the adhesion layer.

The epoxy used for the adhesion layer contained Epiclon S-129 (Dai-Nippon Ink Co.) as a principal agent. BMI-12 (Yuka-Shell Epoxy Co.) was used as a hardening agent. The composition ratio of the principal agent and the hardening agent was 20:1 by weight. As a light-curing resin, a mixture composed of trimethylolpropane triacrylate, 1,6-hexanediol diacrylate, Irgacure 907 (Ciba-Geigy Co.) KAYARAK DETX, and dicumyl peroxide was used. The composition ratios of the components of the above light-curing adhesive were respectively 20, 10, 1, 0.3 and 1. The compounding ratios of the epoxy resin to the light-curing resin were 70 to 30 by weight.

Various optical disks, each having a structure as shown in FIG. 1, were fabricated by changing the adhesive variously. They were subjected to environment test under the conditions of 80° C. 90% RH for 3000 hours. Bit error rates were measured after the environment test. The bit error rates after the environment test, normalized to those before the environment test, are shown in Table 2 together with their state after the environment test.

The process for fabricating the optical disks is described in what follows. By injection-compression molding, two polycarbonate substrates were provided with grooves for tracking having a spiral shape with 1.6 μ pitch. On each of the above substrates, a 800 Å thick film was formed by RF reaction magnetron sputtering method using a sintered target made of SiAl onto the face on which the above grooves for tracking were formed. Thereafter, another film having a thickness of 900 Å was formed on the above film by DC magnetron sputtering method using an alloy target made of NdDyFeCo. Thereafter, still another film having a thickness of 800 Å was formed on the above 900 Å thick film by RF reaction magnetron sputtering method using an alloy target made of SiAl. The two substrates provided with the above films were pasted together, wherein the adhesive was changed variously. Other than the roll-coat method, the substrates were pasted together by coating one of the substrates with an adhesive in a donut shape on the face on which the recording layer was formed, then removing bubbles from the adhesive in vacuum, pasting the substrate with the other substrate together in vacuum in such a manner as the central holes of the two substrates meet together, then irradiating the substrates with UV-light at a power of 80 mW/cm for 15 seconds using an ultra high pressure mercury lamp to harden the UV-setting component of the adhesive, thereafter heating the substrates at 60° C. for 5 hours to preharden the thermo-setting component of the adhesive, and then heating at 100° C. for 2 hours to harden the adhesive.

TABLE 2

| Adhesive () in units wt % | BER* | State after the Environment test |
|---|---|---|
| Present Invention | | |
| Epiclon S-129 (50) Epiclon S-830 (10) Epicure BMI-12 (5) KAYARAD TMPTA (35) Irgacure 907 (2) Dicumylperoxide (2) | 1.0 | No change |
| Epiclon 830-S (60) Epicure BMI-12 (4) HAYARAD HDDA (20) KAYARAD DPHA (10) Irgacure 907 (3) Dicumylperoxide (3) | 1.0 | No change |
| Epiclon S-129 (40) Epiclon 855 (20) Epiclon 520 (10) Epicure EMI-24 (3) KAYARAD TMPTA (20) Irgacure 65 (4) Dicumylperoxide (3) | 1.1 | No change |
| Epicoat 807 (50) Epicoat 815 (10) Epicure IBMI-12 (3) KAYARAD DPCA 60 (33) Irgacure 907 (2) KAYACUREDETX (0.5) Benzoylperoxide (1.5) | 1.0 | No change |
| Epicoat 807 (50) Epicoat 802 (20) Epicure BMI-12 (3) NK Ester TMPT (23) Irgacure 907 (2) Darocure 1116 (0.5) Dicumylperoxide (1.5) | 1.0 | No change |
| Epiclon S-129 (50) Epiclon 830 (17) Epicure EMI-24 (3) KAYARAD TMPTA (20) NK Ester HD (5) KAYACUREBIBI (3) Dicumylperoxide (2) | 1.0 | No change |
| Comparative Examples | | |
| Epiclon S-129 (96) IBMI-12 (4) | 1.0 | The adhesive overflowed the outer circumference of the substrates at pasting. |
| TMPTA (96) Irgacure 907 (4) | 30 | Cracks occurred in the inner circumference part. |
| Roll-coat (polyester based) | Unable to measure | Cracks and intense corrosion occurred. |
| Roll-coat (urethane based) | Unable to measure | Cracks and intense corrosion occurred. |

$$BER = \frac{\text{Bit Error Rate after Weather Resistance Examination}}{\text{Bit Error Rate before Weather Resistance Examination}}$$

| | |
|---|---|
| Epiclon S-129 | Produced by Dai Nippon Ink Co. |
| Epiclon 830 | " |
| Epiclon 830-S | " |
| Epiclon 855 | " |
| Epiclon 520 | " |
| Epicoat 807 | Produced by Yuka-Shell Epoxy Co. |
| Epicoat 802 | " |
| Epicoat 815 | " |
| Epicure IBMI-12 | " |
| Epicure BMI-12 | " |
| Epicure EMI-24 | " |
| KAYARAD HDDA | Produced by Nihon Kayaku Co. |
| KAYARAD TMPTA | " |
| KAYARAD DPHA | " |
| KAYARAD DPCA-60 | " |
| NK Ester TMPT | Produced by Shin-Nakamura Chemical Co. |
| NK Ester HD | Produced by Shin-Nakamura Chemical Co. |
| Irgacure 651 | Produced by Ciba-Geigy Co. |
| Irgacure 907 | " |
| Gurocure 1116 | Produced by Merck Co. |
| KAYACURE BIBE | Produced by Nihon Kayaku Co. |
| KAYACURE DETX | " |

As shown in Table 2, the optical disk of the present invention is reliable for a long periods of time because its bit error rate does not change even under such conditions as 80° C. 90% RH.

The present invention is not limited to Example 2. For example, although an NdDyFeCo layer was used as a recording layer in this example, the recording layer may be formed using an opto-magnetic layer such as an NdDyTbFeCo layer, a GdTbFeCo layer and the like and an optical phase transition type layer such as a Te-TeOx layer, an In-Ag layer and the like. As a protecting layer, such layers as a SiN layer, a SiO layer, an AlN layer and the like may be used other than the SiAlN layer. Furthermore, although the optical disks of this example are of two face type, they may be of one face type formed by pasting together a substrate provided with a recording layer and another substrate without any recording layer. Although the adhesives used in this example were mainly combinations of only principal agents and hardening agents, reactive diluents and additives such as hardening-facilitating agents, filling agents, silane-coupling agents, leveling agents, stabilizers and the like may be added to the adhesives to an amount which does not affect the properties of the adhesives after hardening.

When the adhesive pasting two substrates is heated to harden, strain occurs in the substrates according to the way in which the substrates are placed. When the substrates are laid, strain occurs intensively. But when the substrates are set upright, practically no strain occurs.

The adhesive does not overflow in the heating-curing step because it is hardened by UV-light in the inner and outer circumference parts of the substrates.

It is convenient to use bis-phenol F or bis-phenol A, to each of which a small amount of reactive diluents are added as a principal agent of the epoxy resin. They have a viscosity of equal to or less than 5000 cps, and therefore, they are easy to handle. It is easy to paste substrates together using them, and to remove bubbles. If the substrates are pasted together using an adhesive containing a lot of bubbles, strain occurs in the substrates when the adhesive hardens. This affects the signals unpreferably, and as a result of this, the reliability decreases. It is preferred to use ring-shaped aliphatic amines such as imidazole-based amines methanediamins and the like as a hardening agent of the epoxy resin from the viewpoint of the heat resistance of the hardened substance and the pot-life of the adhesive. The hardening agent is properly added to the principal agent at a ratio of from 1 to 10%. If the hardening agent is added at a ratio of equal to or less than 1%, it takes long for the adhesive to harden, or the hardening of the adhesive becomes insufficient. If the hardening agent is added at a ratio of equal to or more than 10%, the pot life of the adhesive descreases, coating using machines becomes difficult, and the heat resistance of the hardened substance lowers. It is preferred to adjust the quantity of the hardening agent to be added and the components of the principal agents so that the properties of the hardened substance can be maintained and the pot-life of the adhesive in not less than 5 hours. It is preferred that hardening agents being solid at room temperature are mixed with those which are liquid at room temperature, because the hardening agents being liquid at room temperature can be easily mixed with the principal agents.

It is preferred that the light-setting resin to be used in the present invention have a high reactivity and a low viscosity at room temperature. Therefore, monomers or oligomers of acrylates are preferably used as the main components of the light-curing resin. Examples of the above acrylates include hexanediol acrylate, neopenthylglycole diacrylate, butanediol diacrylate, diethyleneglycole diacrylate, trimethylolpropane triacrylate, pentaerythritol tri(tetra)acrylate, dipentaerythrytol hexaacrylate, and the like. Mixtures composed of one, two or more than two compounds chosen from the above listed acrylates are used as the main components of the light-setting resin. It is necessary to use hardening agents absorbing light having a wavelength of longer than 300 nm. Examples of the hardening agents include Darocure-1116 and 2273 by Merck Co., Irgacure 651 and 907 by Ciba-Geigy, benzoin-isobutylether and benzoinisopropylether. For cases of hardening the adhesives in two-faced media, in which the adhesives must be hardened also in places which cannot be irradiated with light, peroxides such as decimal peroxide, benzoyl peroxide and the like may be added to the adhesives to provide them with not only light-setting property but also thermo-setting property. Furthermore, a small amount of sensitizer such as diethylthioxanton, anthracene, isopropylthioxanton and the like may be added.

Example 3

As the structure of the optical disks in this example, the structure shown in FIG. 1 was used.

The hard coat layer was formed by spin coating one of the faces of each substrate with a mixture composed of dipentaerythrytol hexaacrylate 30%, 1,6-hexanediol diacrylate 30%, urethane-acrylate 35%, benzyldimethylketal 3%, γ-glycidoxy propyltrimethoxy silane 2% and sodium dialkylsulfosuccinate 100 ppm and thereafter hardening the adhesive by irradiating light using a high pressure mercury lamp.

Next, the adhesive will be explained. (—) indicates parts by weight at compounding. As a compound having an epoxy ring and a (metha)acryloyl group, a mixture of bis-phenol F having an acryloyl group on one side and an epoxy ring on the other side and bis-phenol F having epoxy rings on both sides (30). As an initiater of polymerization of the epoxy, 2-ethyl-4-methylimidazol was used (2).

As an initiater of light polymerization, Irgacure 907 (Ciba-Geigy) was used (1). As an organic peroxide, t-butylperoxy-2-ethylhexanoate was used (1). In addition to them, γ-glycidoxypropyl trimethoxysilane was used as a silane coupling agent (1). The substrates were pasted together by the following steps. One of the substrates was coated in a ring shape with the adhesive on the face on which the recording layer was formed. It was then pasted with another optical disk in vacuum, which was then taken out of the vacuum and heated by a far-infrared lamp to spread the adhesive. The pasted substrates were then irradiated with UV-light to temporarily fix the disk, and thereafter heated at 60° C. for 5 hours to harden the adhesive in the part into which the light did not penetrate. Environment test were carried out under the conditions of 70° C. 90% RH on the optical disks having a structure as shown in FIG. 1 fabricated by pasting the substrates, wherein the adhesive was changed variously. The results are shown in Table 1. As the results indicate, the optical disks fabricated by pasting substrates together using the adhesives according to the present invention are excellent in weather resistance and have reliability for a long periods of time.

TABLE 1

| | Kind of Adhesive () in units of wt % | BER* |
|---|---|---|
| Present invention | | |
| Compound Example 1 | bis-EP-AC (20), bis-EP-EP (20) 1,6-hexanediol di acrylate (20) 2-ethyl-4-methyl imidazole (2) | 1.1 |

TABLE 1-continued

| | Kind of Adhesive () in units of wt % | BER* |
|---|---|---|
| Compound Example 2 | perbutyl D (1), Irgacure 907 (1) bis-EP-AC (20), bis F-EP-EP (20) trimethylolpropane triacrylate (20) IBMI-12 (2) Irgacure 651 (1), Peroyl 355 (1) | 1.0 |
| Compound Example 3 | bis-Ep-A (20), bis F-EP EP (20) bis F-AC-AC (10) neopenthylglycole diacrylate (10) BMI-12 (2), Darocure-2273 (2) t-butyl peroctoate (1) | 1.1 |
| Compound Example 4 | H-EP-Ac (20), bis F-EP-EP (20) IBMI-12 (2), Irgacure 907 (1) Darocure 1164 (1) benzoylperoxide (1) | 1.0 |
| Compound Example 5 | H-EP-AC (20), bis A-EP-EP (10) BMI-12 (2), Irgacure 907 (1) Peroyl A (1) | 1.1 |
| Comparative Examples | | |
| Comparative Example 1 | A Roll-coat Type Adheive | Unable to Measure |
| Comparative Example 2 | Two-liquid Type Epoxy Resin | Unable to Measure |
| Comparative Example 3 | A One-liquid Type Epoxy Resin | Unable to Measure | bis A-EP-AC: A compound prepared by adding epichlorhydrin and acrylic acid to bis-phenol A.
bis A-EP-EP: A compound prepared by adding epichlorhydrin to both sides of bis-phenol A.
bis F-EP-AC: A compound prepared by adding epichlorhydrin and acrylic acid to bis-phenol F.
bis I-EP-EP: A compound prepared by adding epichlorhydrin to both sides of bis-phenol F.
bis F-AC-AC: A compound prepared by adding acrylic acid to both sides of bis-phenol F.
H-EP-AC: A compound prepared by adding epichlorhydrin and acrylic acid to hexanediol.
Perbutyl O: Produced by Nihon Yushi Co.
Peroyl 355: Produced by Nihon Yushi Co.
Peroyl A: Produced by Nihon Yushi Co.
Irgacure 907: Produuced by Ciba-Geigy Co.
Irgacure 651: Produced by Ciba-Geigy Co.
Darocure 2273: Produced by Merck Co.
Darocure 1164: Produced by Merck Co.
IBMI-12: Epicure IBMI-12 produced by Yuka-Shell Epoxy Co.
BMI-12: Epicure BMI-12 produced by Yuka-Shell Epoxy Co.

In the present invention, when a compound having at least an epoxy ring and a (metha)acryloyl group or a methacryloyl group is used as an adhesive, it can be hardened by irradiating with light as well as by heating. When substrates are pasted together using an adhesive having only thermosetting property, the adhesive lowers its viscosity and overflows the edge of the substrates when the substrates are heated, with the result that handling is not easy. Therefore, it is necessary to temporarily fix the substrates using a process other than heating. Processing is easy in the present invention because it is possible to temporarily fix the substrates by irradiating with light, since the adhesion layer is formed also in the part on which no recording layer is formed. No problem arises in hardening the adhesive in the part on which the recording layer is formed, into which light does not penetrate, because the adhesive can be hardened by heating. As described above, the adhesive of the present invention is suited for use in which temporal fixing is carried out by light and hardening is carried out by heating.

These examples should not be interpreted as limiting the present invention to them. For example, the recording layer in this example was made of an opto-magnetic recording material NdDyFeCo. However, the present invention can be applied to the cases in which the recording layer is made of TbFeCo, DyTbFeCo, GdTbFe as well as optical phase transition type materials such as Te-TeO, TeInSb and the like, and organic pigments such as cyanine and the like. The protecting layer may be formed using a SiN layer, an AlN layer, a SiO layer, complex oxides, complex oxinitrides and the like, other than the SiAlNO layer. The structure is not limited to that in which a recording layer is sandwiched by protecting layers. It may have a structure in which the recording layer is directly formed on a substrate, or a structure in which a reflective layer is formed on the substrate as in the case of compact disks.

Other than the adhesive shown in this example, such compounds as having a plurality of epoxy rings or a plurality of acrylate groups may be used. As for the acrylates, they may be polyfunctioned acrylates such as trimethylolpropane triacrylate, neopenthylglycole diacrylate, dipentaerythrytol hexaacrylate, and the like, as well as mono-functioned acrylates. As for the organic peroxide, it may be any peroxide having a decomposition temperature within the range of, from the view point of ease in handling, between room temperature and 80° C. As for the silane coupling agent, it may be any silane coupling agent which has, from the view point of ease in handling, a relatively low vapor pressure and can react under the temperature of 80° C.

As for the compounds used in the present invention having epoxy rings and (metha)acryloyl groups, those having in ratio more epoxy rings than acryloyl groups or methacryloyl groups are excellent in hardening shrinkage, heat resistance and adhesion of the adhesive. More preferably, the ratio of the epoxy rings to the acryloyl groups or the methacryloyl groups is within the range of from 90:10 to 70:30.

As hardening agents of the epoxy resin, there are acids, amines and amides. They should be properly chosen according to their usage. For example, if relatively high transparency is required, acid-based hardening agents should be used; if it is required to harden the epoxy resin at a low temperature, amine- or amide-based hardening agents should be used, and if it is desired to harden the epoxy resin at room temperature, aliphatic or aromatic amines should be used. Since liquid hardening agents are easy to handle, solid materials are preferably transformed to liquids, for example, by mixing them with liquid hardening agents.

Examples of the compounds having epoxy rings and (metha)acryloyl groups to be used in the present invention include such aromatic compounds as those prepared by adding epoxy rings or (metha)acryloyl groups to both sides of bis-phenol A or bis-phenol F, and the like, and such aliphatic compounds as those prepared by adding epoxy rings or (metha)acryloyl groups to both sides of hexanediol or butanediol, and the like. Examples of the polymerization agents of the epoxy resin include aliphatic polyamine, polyamide resin, tertiary amines, amine salts and the like as room temperature hardening type, and aromatic diamines, oxides anhydrous, Lewis acid complexes and the like as high-temperature hardening type. Other than these compounds, imidazole compounds may also be used as hardening agents.

Example 4

The process for fabricating optical disks according to the present invention will be explained in detail with reference to the figures.

Figure 2A:
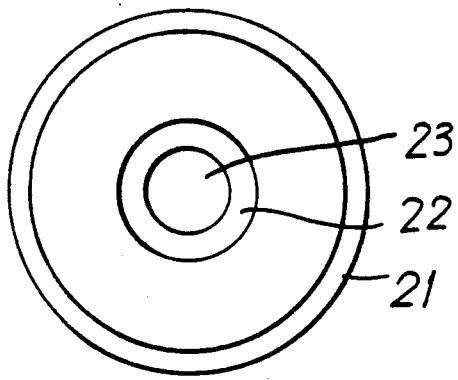
FIG. 2(a), FIG. 2(b), FIG. 2(c), FIG. 2(d), FIG. 2(e) and FIG. 2(f) show the main steps of an example of the process for fabricating optical disks according to the present invention.
Figure 2B:
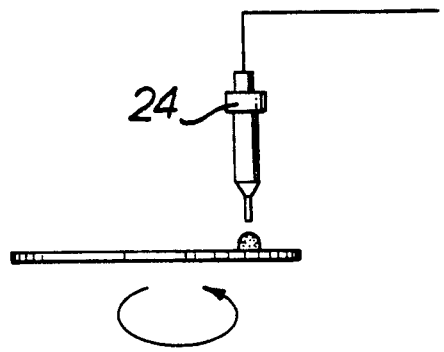
Figure 2D:
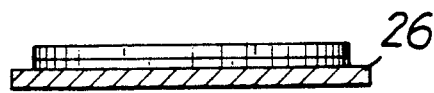
Figure 2C:
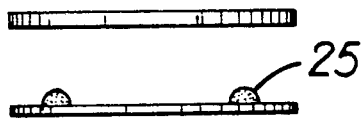
Figure 2E:
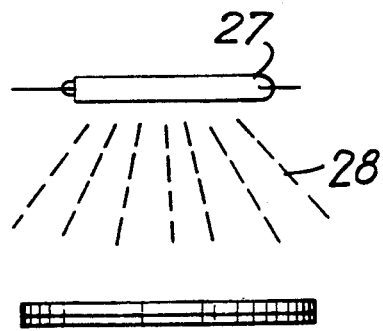
Figure 2F:
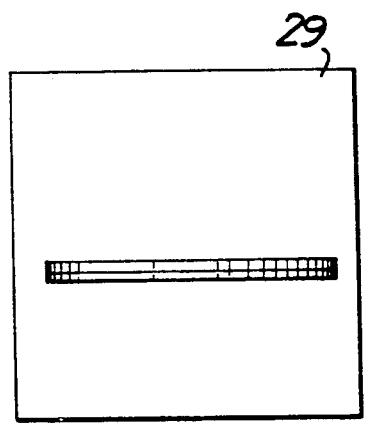

FIGS. 2(a) through (f) are schematic drawings for explaining the process for fabricating optical disks according to the present invention. FIG. 2(a) shows an optical disk, wherein numeral 12 indicates the outer circumference part of substrate, on which no recording layer is formed, numeral 22 indicates the inner circumference part of the substrates, on which no recording layer is formed, and numeral 23 indicates the central hole of the disk. FIG. 2(b) shows a step of coating a substrate with an adhesive using a dispenser indicated by numeral 24. FIG. 2(c) shows a step of pasting the substrate coated with the adhesive and another substrate together, wherein numeral 25 indicates the adhesion layer coated in a ring shape. FIG. 2(d) shows a step of spreading the adhesive of the above pasted substrates using a heater indicated by numeral 26. FIG. 2(e) shows a step of hardening the adhesive in the parts 21 and 22 by irradiating them with UV-light indicated by numeral 28 using a metalhalide lamp indicated by numeral 27. FIG. 2(f) shows a step of hardening the adhesion layer in the parts other than 21 and 22, which did not harden in FIG. 2(e), wherein numeral 29 indicates an oven. These steps proceed in the order of from (a) to (f).

Figure 3:
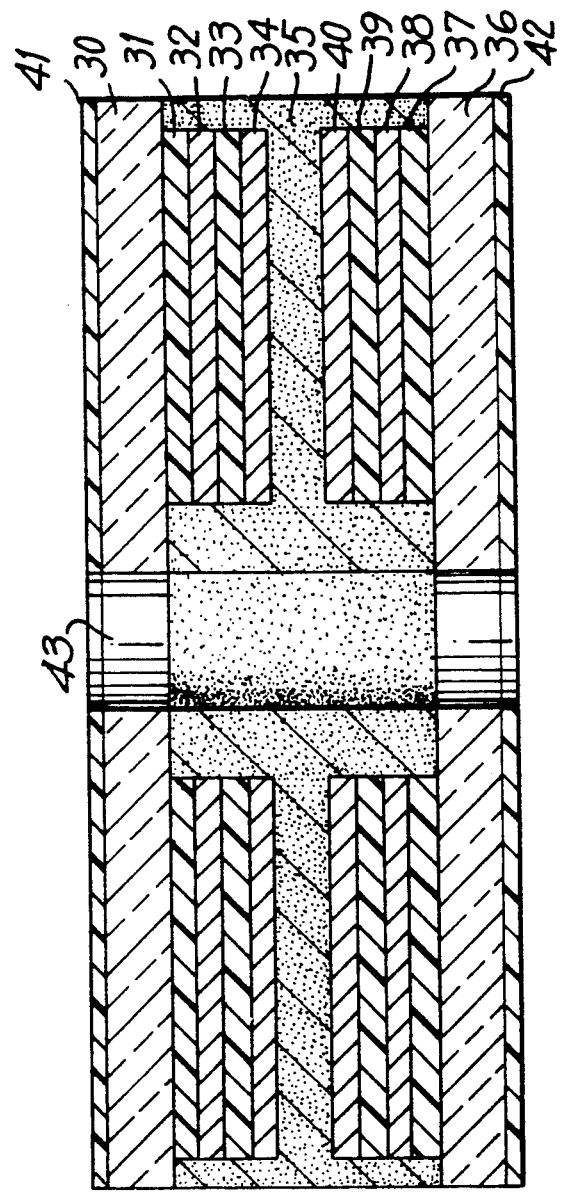
FIG. 3 shows a main cross sectional view of a conventional optical disk.

FIG. 3 shows the fundamental structure of the optical disk according to the present invention. Numerals 30 and 36 each indicate a substrate made of polycarbonate, numerals 31 and 37 each indicate a layer made of SiAlN, numerals 32 and 38 each indicate a layer made of TbFeCo, numerals 33 and 39 each indicate a layer made of SiAlN, numerals 34 and 40 each indicate an Al layer, numeral 35 indicates an adhesion layer, and numerals 41 and 42 each indicate a hard coat layer. The substrates 30 and 36 made of polycarbonate were formed by injection-compression molding. The SiAlN layers 31 and 37 were formed by RF reaction magnetron sputtering method using a sinterred target made of SiAl and a mixed gas composed of nitrogen and argon. The TbFeCo layers 32 and 38 were formed by DC magnetron sputtering method using an alloy target made of TbFeCo. The SiAlN layers 33 and 39 were formed by RF reaction magnetron sputtering method, as in the formation of the SiAlN layers 31 and 37, using a mixed gas composed of nitrogen and argon. The Al layers 34 and 40 were formed by DC magnetron sputtering method using an Al target and an argon gas. The adhesion layer 35 was formed by coating in a ring shape one of the substrates on the side on which the recording layer was formed with a mixture composed of Epiclon S-129 (Dai Nippon Ink Co.), Epicure IBMI-12 (Yuka-Shell Epoxy Co.), 1,6-hexandiol diacryllate, t-butyl-peroxy isobutylate and Irgacure 907 (Ciba-Geigy Co.), thereafter pasting it with the other substrate together in vacuum, heating the pasted substrates on a hot plate to spread the adhesive, irradiating the substrates with UV-light using a metalhalide lamp to temporarily harden the adhesive in the parts in which no recording layer was formed, and then heating the substrates at 50° C. for 3 hours and further at 60° C. for 8 hours to harden the adhesive. The hard coat layers 41 and 42 were formed by spin coating the surfaces of the substrates with a mixture composed of trimethylolpropane triacrylate, 1,6-hexandiol diacrylate and Irgacure 907 (Ciba-Geigy Co.), and then irradiating them with UV-light using a high pressure mercury lamp.

Next, explanations will be made about the optical disks fabricated by conventional processes. In an optical disk fabricated by pasting substrates by roll-coat method, the recording layer was oxidized and the bit error rate increased when it was subjected to environment test under the conditions of 70° C. 90% RH for 1000 hours. The optical disk according to the present invention was subjected to the said environment test simultaneously, but no change was observed in the bit error rate. An optical disk fabricated by pasting substrates using a conventional epoxy resin had a thicker adhesion layer because the viscosity of the adhesive was high when the substrates were pasted together. As a result of this, the extent of the face-swing was larger than that of the optical disk according to the present invention. The face-swing was 7 miliradians at its maximum for the optical disk using the conventional epoxy resin, while it was 2 miliradians at its maximum for the optical disk according to the present invention. Furthermore, in the optical disk formed by pasting the substrates using the conventional epoxy resin, the adhesive overflowed the outer circumference of the disk when it was hardened, resulting in that the disk looked undecent. In cases in which an adhesive hardening by heat was used, it was difficult to control its temperature, and it was necessary to keep the substrates fixed so that they did not move when the adhesive was hardened. When the substrates were pasted together using an adhesive hardening at room temperature, stress was applied to the recording layer as the adhesion layer hardened, with the results that the envelope of the reproduced signals was disturbed and the error rate increased. As described above, the optical disks fabricated by the conventional processes have problems in that they are poor in environmental test that they cannot be fabricated easily, and that their production yield is low. On the contrary, the present invention eliminates the problems which have arisen conventionally, and provides optical disks having a high reliability which can be fabricated easily. It is preferred that as an adhesive a mixture is used which at least contains principal agents of epoxy resin and their hardening agents, principal agents of UV-curing resin and their hardening agents, to which organic peroxides are added.

Examples of the principal agents of the epoxy resin include bis-phenol A based resin, bis-phenol F based resin, novolacbased resin, and the like, to each of which reactive diluents, which are low-viscosity epoxy, are added or not. The more reactive diluents are contained in the adhesive, the lower the viscosity of the adhesive becomes, with a result that its handling becomes easier. However, the heat resistance and the reactivity of the adhesive decrease, with another result that the properties of the adhesion layer degrades. Therefore, the amount of the reactive diluents to be added to the adhesive should be preferably small.

The hardening agents of the epoxy include oxides anhydrous, aromatic amines, aliphatic amines, amides, and the like. It is preferred to use hardening agents having a pot-life of from 1 to 50 hours at room temperature, and being able to be hardened at a temperature of from 40° to 80° C. Examples of such hardening agents include imidazole-based compounds such as 2-ethyl-4-methylimidazole, 1-benzyl-2-methylimidazole, 1-isobutyl-2-methylimidazole and the like, and ring-shaped aliphatic amines such as methanediamine and the like.

It is preferred to use principal agents of UV-setting resin having a relatively low viscosity at room temperature and a high reactivity. Examples of such compounds include 1,6-hexanediol diacrylate, trimethylolpropane triacrylate, neopentylglycole diacrylate, dipentaerythrytol hexaacrylate, trimethylolpropane triacrylate, and the like. The main components of the principal agents are preferably chosen from these compounds.

As for the hardening agents of the UV-curing resin, those absorbing light having a wavelength of not less than 300 nm are used.

Examples of such hardening agents include benzylmethyl ketal, 1-hydroxycyclohexyl phenylketone, 2-methyl-[4-(methylthio)-phenyl]-2-morphorino-1-propanone, benzoin, benzoethylether, 1-(4-isopropylphenyl)-2-hydroxy-2-methylpropane-1-on, 2-hydroxy-2-methyl-1-phenylpropane-1-on, 3,3-dimethyl-4-methoxybenzophenone, and the like.

It is preferred to use organic peroxides decomposing within several hours upon heating at a temperature of from 40° to 70° C. Examples of such compounds include di-n-propylperoxy dicarbonate, di-milystylperoxy dicarbonate, cumylperoxy neohexanoate, di(2-ethoxyethyl)peroxy dicarbonate, (di(methoxyisopropyl)-peroxy dicarbonate, di(2-ethylhexyl)peroxy dicarbonate, t-hexylperoxy neodecanoate, 2,4-dichlorobenzoyl peroxide, t-hexylperoxy pivalate, t-butylperoxy pivalate, 3,5,5-trimethyl hexanoylperoxide, octanoylperoxide, decanoylperoxide, lauroxylperoxide, cumylperoxy octoate, succinic acid peroxide, acetylperoxide, t-butylperoxy(2-ethylhexanoate), m-toluylperoxide, benzoylperoxide, t-butylperoxy isobutylate, 1,1-bis(t-butylperoxy)3,3,5-trimethylcyclohexane, 1,1-bis(t-butylperoxy)-cyclohexane, t-butylperoxy maleinic acid, t-butylperoxy laurate, t-butylperoxy 3,5,5-trimethylhexanoate, cyclohexanoneperoxide, t-butylperoxy arylcarbonate, t-butylperoxy isopropylcarbonate, 2,5-dimethyl-2,5-di(benzoylperoxy)hexane, 2,2-bis(t-butylperoxy)octane, t-butylperoxy acetate, 2,2-bis(t-butylperoxy)butane, t-butylperoxy benzoate, and the like.

In the present invention, it is necessary to change the temperature at pasting the substrates together, according to the viscosity of the adhesive used. It is preferred to raise the temperature to a temperature higher than room temperature, but it is preferred to set it to a temperature lower than 70° C. so that a stationary temperature can be obtained easily. More preferably, the temperature is within the range of from 40° to 60° C. The substrates are heated to harden the adhesive at a temperature of, according to the hardening temperature of the adhesive, preferably within the range of from 40° to 80° C. More preferably, it is within the range of from 50° to 70° C.

As for the compound ratio of epoxy and UV-setting resin in the present invention, the more epoxy in the compound ratio, the better the properties of the adhesive. Preferred compound ratio between the epoxy and the UV-curing resin is within the range of from 95:5 to 70:30 by weight, wherein the epoxy represents the principal agents of the epoxy and their hardening agents, and the UV-curing resin represents a mixture of the principal agents of the UV-setting resin and their hardening agents, to which organic peroxides are added.

When the substrates are pasted together under a decreased pressure in the present invention, it is easy to remove bubbles, and the adhesion layer hardly takes in bubbles.

Furthermore, the adhesion layer is explained. Epiclon S-129 by Dai Nippon Ink Co. was used as a principal agent of epoxy, Epicure BMI-12 by Yuka-Shell Epoxy Co. was used as a hardening agent of the epoxy, Irgacure 261 by Ciba-Geigy was used as an initiator for light- or thermal-cationic polymerization, cumenhydroperoxide was used as an organic peroxide, and γ-glycidoxypropyl trimethoxysilane was used as a silane coupling agent. A substrate was coated in a donut shape centered at the center of the recording layer, on the side on which the recording layer is formed, with a mixture composed of 7 wt % of a hardening agent prepared by compounding BMI-12, Irgacure 261, cumenhydroxyperoxide and γ-glycidoxypropyl trimethoxysilane at a ratio of 3:1:1:2 and 93 wt % of S-129. The substrate was pasted with the other substrate together in vacuum. Then, the vacuum system was leaked, and the disk was irradiated with UV-light to temporarily fix the disk with the disk being rotated. Thereafter, the disk was heated at 60° C. for 5 hours to harden the adhesive. The disk has parts in which no recording layer is formed in the outer and inner circumference parts, which enables fixing the disk temporarily by irradiating it with UV-light.

The optical disk of the present invention was subjected to environment test under the conditions of 70° C. 90% RH for 3000 hours, with the adhesive being changed. The results are shown in Table 1. As the results indicate, the optical disk according to the present invention does not change its state and its bit error rate. Therefore, the optical disk according to the present invention has a reliability for a long periods of time. Furthermore, this example is suited for mass production because it enables to temporarily fix the outer and inner circumference parts of the disk.

TABLE 1

| Kind of Adhesive ( ) in units of wt % | BER* | State |
|---|---|---|
| Examples | | |
| Epiclon S-129 (20), methanediamine (1), Irgacure 261 (1) cumenhydroperoxide (1) | 1.1 | No change |
| Epiclon S-129 (20) N-aminomethyl piperazine (1) Irgacure 261 (1) t-butylhalideperoxide (1) | 1.0 | No change |
| Epiclon 830-S (20) 1-benzyl-2-methylimidazole (1) Irgacure 261 (1) cumenhydroperoxide (0.5) benzoylperoxide (1) | 1.1 | No change |
| Epicoat 830-S (10) Epiclon S-129 (10), Irgacure 261 (1), isopopylisostearoyl disacrylate (1) isononanoyl peroxide (1) | 1.0 | No change |
| Epicoat 808 (20), Irgacure 261 (1), 2-ethyl-4-methylimidazole (1), Epiclon 520 (2), γ-glycidoxypropyl-trimethoxysilane (1) | 1.0 | No change |
| Epicoat 807 (20), isohorondiamine (1), 2-methylimidazole (1), Irgacure 261 (1) cumenhydroperoxide (1) Adecatol SO-120 (1) γ-methacryloxypropyl trimethoxysilane (1) | 1.2 | No change |
| Comparative Examples | | |
| Roll-Coat (polyester-based) | Unable to Measure | Intense Corrosion in the Circum- |

TABLE 1-continued

| Kind of Adhesive ( ) in units of wt % | BER* | State |
|---|---|---|
| | | ference Parts |
| Roll-Coat (urethane-based) | Unable to Measure | Intense Corrosion on the Whole Face |
| Epoxy-based Adhesive by T Company | Unable to Measure | Unevenness on the Surface |

*BER = $\dfrac{\text{Bit Error Rate after environment test under the Conditions of 70° C, 90\% RH for 3000 Hours}}{\text{Bit Error Rate before Weather Resistance Examinations}}$ Epiclon S-129
Epiclon 830-S: Produced by Dai Nippon Ink Co.
Epiclon 520
Irgacure 261: Produced by Ciba-Geigy Co.
Epicoat 808: Produced by Yuka-Shell Epoxy Co.
Epicoat 807
Adecadol SO-120: Produced by Asahi Denka Co.

These examples should not be interpreted as limiting the present invention to them. Various changes are possible within the range of the principle of the present invention. For example, although the optical disk of the present invention had a structure that a ceramic layer, a recording layer, another ceramic layer and a metallic layer, as a total four layers, are formed on each of the substrates made of polycarbonate, the disk may have a structure that only three layers, a ceramic layer, a recording layer and another ceramic layer are formed on each of the substrates and two of the said substrates are pasted together. The disk may have another structure that a substrate on which a ceramic layer, a recording layer and another ceramic layer are formed is pasted together with a polycarbonate substrate on which only a ceramic layer is formed. The disk may have still another structure that a substrate provided with the above films is pasted together with a polycarbonate substrate on which no film is formed. The components of the adhesion layer may not necessarily contain hardening agents of the epoxy.

As examples of the ceramic layer, a SiN layer, an AlN layer, a SiAlNo layer, and the like may be used other than a SiAlN layer. No problem arises even when the material of one ceramic layer is different from the other ceramic layer, both layers sandwitching a recording layer. Examples of the recording layer includes opto-magnetic recording layers such as a NdDyFeCo layer, a GdTbFe layer and the like other than a TbFeCo layer, phase transition type recording layers such as a Te-TeOx layer, a TeSbAs layer and the like, and organic recording layers, using an organic pigment such as cyanine. There are cases in which no ceramic layer is needed according to the kind of the recording layer.

Furthermore, although the substrates were temporarily fixed by irradiating them with UV-light in the present invention, the temporal fixing may be carried out also by heat when initiators being able to harden thermally are applied. Then, the adhesive can be hardened using infrared-light, microwave, a high-frequency wave, and the like.

In the present invention, the amount of addition of silane or metallic coupling agents was set to 0.5 to 8% by weight to the total weight of the adhesive. If it is less than 0.5% by weight, the adhesion under a high temperature and high humidity is not sufficient, with the result that the reliability of the optical disk is inferior. On the other hand, if it is larger than 8% by weight, the weather resistance of the optical disk tends to decrease, it is affected by the low molecular weight components such as alcohol, water and the like generated by decomposition of the coupling agents. However, it is not said that the amount of the coupling agents to be added may not be less than 0.5% by weight or more than 8% by weight. it is said that it is proper to set the above amount to within the range of from 0.5 to 8% by weight. More preferably, it is within the range of from 1 to 5% by weight. Furthermore, organic peroxides are added at a ratio of from 0.1 to 5% by weight in the present invention. If it is added at a ratio of less than 0.1% by weight, it takes long until the adhesive hardens, and if it is added at a ratio of more than 5% by weight, the properties of the adhesive tend to be poorer. It is not said that the amount of addition of the organic peroxides may not be less than 0.1% by weight or more than 5% by weight. It is said that it is proper to set the amount to within the range of from 0.1 to 5% by weight. More preferably, it is within the range of from 0.5 to 3% by weight.

Since principal agents of epoxy having a low viscosity are easy i handling, it is preferred to use a mixture prepared by adding a small amount of glycidylether, diglycidylether and the like as reactive diluents to bisphenol F, phenol novolac, and bis-phenol A type epoxy resin. The reactive diluents degrade the properties of the epoxy resin after hardening, therefore, it is preferred to use them at an amount as small as possible, for example equal to or less than 30% by weight.

Examples of the ring shaped aliphatic amines to be used as hardening agents of the epoxy resin include 1isobutyl-1-methylimidazole, 2-ethyl-4(5)-methylimidazole, 1-benzyl-2-methylimidazole, 2-methylimidazole, imidazole, 1-cyanoethyl-2-ehtyl-4(5)-methylimidazole, methanediamine, N-aminomethyl piperazine, N-methylmorphorin, 1,3-diaminocyclohexane, isohorondiamine, and the like. A mixture composed of one, two or more than two compounds chosen from the above compounds is used. Of these, methanediamine-based compounds and imidazole-based compounds are preferably used in order to maintain their pot-life for a relatively long time when they are mixed with principal agents of the epoxy resin. It is proper to add them at a ratio of from 2 to 7%. If it is less than 2%, the epoxy hardens insufficiently. On the other hand if it is more than 7%, their pot-life shortens. More preferably, it is within the range of from 3 to 5%.

Examples of the coupling agents to be added to the adhesives in the present invention include γ-(2-aminoethyl)aminopropyl trimethoxysilane, γ-(aminoethyl-)aminopropylmethyl dimethoxysilane, γ-methacryloxypropyl trimethoxysilane, N-β-(N-vinylbenzylaminoethyl)-γ-aminopropyl trimethoxysilane, γ-glycidoxypropyl trimethoxysilane, γ-mercaptopropyl trimethoxysilane, methyl trimethoxysilane, methyl triethoxysilane, vinyl triacetoxysilane, γ-anilinopropyl trimethoxysilane, vinyl trimethoxysilane, γ-chloropropylmethyl dimethcxysilane, γ-mercaptopropylmethyl dimethoxysilane, methyl trichlorosilane, dimethyl dichlorosilane, trimethyl clorosilane, vinyl trichlorosilane, vinyl tris(-βmethoxyethoxy)silane, β-(3,4-epoxycyclohexyl)ethyl trimethoxysilane, γ-glycidoxypropylmethyl diethoxysilane, N-β(aminoethyl)γ-aminopropyl trimethoxysilane, N-phenyl-γ-aminopropyl trimethoxysilane, methyl dischlorosilane, phenyl trchlorosilane, diphenyl dichlorosilane, tetramethoxysilane, dimethyl dimethoxysilane, phenyltrimethoxysilane, diphenyl dimethoxysilane, decyl trimethoxysilane, tetraethoxysilane, methyl triethoxysilane, dimethyl diethoxysilane, phenyl triethoxysilane, diphenyl diethoxysilane, bis-trimethylacetamide, trimethylsilyl acetamide, bis-trimethylsilyurea, tert-butyldimethyl chlorosilane, siopropyl triisostearoyl titanate, isopropyl tridodecylbenzene, sulfonyl titanate, isopropyl tris-(dioctylbirophosphte)titanate, tetraisopropyl bis(dioctylphosphite)titanate, tetraoctyl bis(ditridecylphosphite)titanate, tetra (2,2-diallyloxymethyl-1-butyl)bis(ditridecyl)phosphite titanate, bis(dioctylbirophosphate) ethilene titanate, isopropyltrioctanoyl titanate, isopropyldimethacryl isostearoyl titanate, isopropylisostearoyl diacryl titanate, isopropyltri(dioctylphosphate)titanate, isopropyltricumylphenyl titanate, isopropyltri(N-amide ethyl, aminoethyl)titanate, dicumylphenyloxyacetate titanate, diisostearoylethylene titanate, acetoalcoxyaluminum diisopropyate, and the like.

Of these coupling agents, γ-glycidoxypropyl trimethoxysilane and γ-methacryloxypropyl trimethoxysilane in particular are easy to handle since their boiling points are higher than 150° C.

Example of the organic peroxides to be added to the adhesives in the present invention include benzoylperoxide, isononanylperoxide, rauroylperoxide, t-butylper-2-ethylhexanoate, 1,1-bis(t-butylperoxy)3,3,5-trimethyl cyclohexane, t-butylperoxyiso-propyl carbonate, t-butylperoxybenzoate, methylethylketone peroxide, t-butylhydroperoxide, dicumyl peroxide, cumenhydroperoxide, di-t-butylperoxide, and the like. Of these compounds, those having a half periods temperature within the range of from 60° to 100° C. are preferred. Example of the said compounds include benzolyperoxide, isononanoylperoxide, t-butylper-2-ethylhexanoate, cumenhydroperoxide, 1,1-bis(tertiarybutylperoxy)3,3,5-trimethylcyclohexane.

Furthermore, surface active agents to improve the wetting properties of surfaces, stabilizers, anti-oxidation agents, and the like may be added in addition to the additives described above.

INDUSTRIAL APPLICABILITY

As described above, the present invention has the following effects:

(1) It has now become possible to industrially provide optical disks which are excellent in environmental resistance and have long-time reliability.

(2) Occurrence of strain in the substrates during the step of hardening the adhesive can be avoided, and therefore, optical disks having high reliability can be now fabricated at a good yield.

(3) The adhesive does not overflow the gap between the substrates during the step of hardening the adhesive by heating. Therefore, these is no need to remove the overflowed adhesive, and thus the fabrication process is simplified. Furthermore, occurence of deficiencies accompanied by the removal of the overflowed adhesive has now been avoided.

What is claimed is:

1. An optical disk, comprising:
a first substrate for supporting a first recording layer and a second substrate for supporting a second recording layer;
each substrate having a first protecting layer formed on a portion thereof, a recording layer formed on the first protecting layer, a second protecting layer formed on the recording layer, and a reflective layer formed on the second protecting layer to form an annular layered structure of each of the substrates;
each of the layered structures on the substrates having a top, an outer side and an inner side and disposed on a portion of both the first and second substrates so that an annular outer portion and an annular inner portion of the substrates is adjacent to and not covered by the layers thereon;
a ceramic layer formed on each said reflective layer and the annular outer portions of the substrates, the outer sides, tops and inner sides of the layered structures and on the inner portions of the substrates; and
the ceramic layers facing each other and an adhesive between and adhering the ceramic layers.

2. The optical disk of claim 1, wherein the recording layers includes a rare earth-transition metal alloy.

3. The optical disk of claim 1, wherein the recording layers are formed on one of the first substrate and the second substrate.

4. The optical disk of claim 1, wherein the adhesive layer includes both UV-curing the thermosetting adhesive.

* * * * *

UNITED STATES PATENT AND TRADEMARK OFFICE
CERTIFICATE OF CORRECTION

PATENT NO. : 5,197,060

DATED : March 23, 1993

INVENTOR(S) : Masahiro Yatake

It is certified that error appears in the above-identified patent and that said Letters Patent is hereby corrected as shown below:

Column 18, line 46, change "the" to --and--.

Signed and Sealed this

Seventh Day of December, 1993

Attest:

BRUCE LEHMAN

Attesting Officer       Commissioner of Patents and Trademarks